July 4, 1944.    L. S. WILLIAMS    2,353,099
CHART
Filed Jan. 4, 1943    2 Sheets-Sheet 1
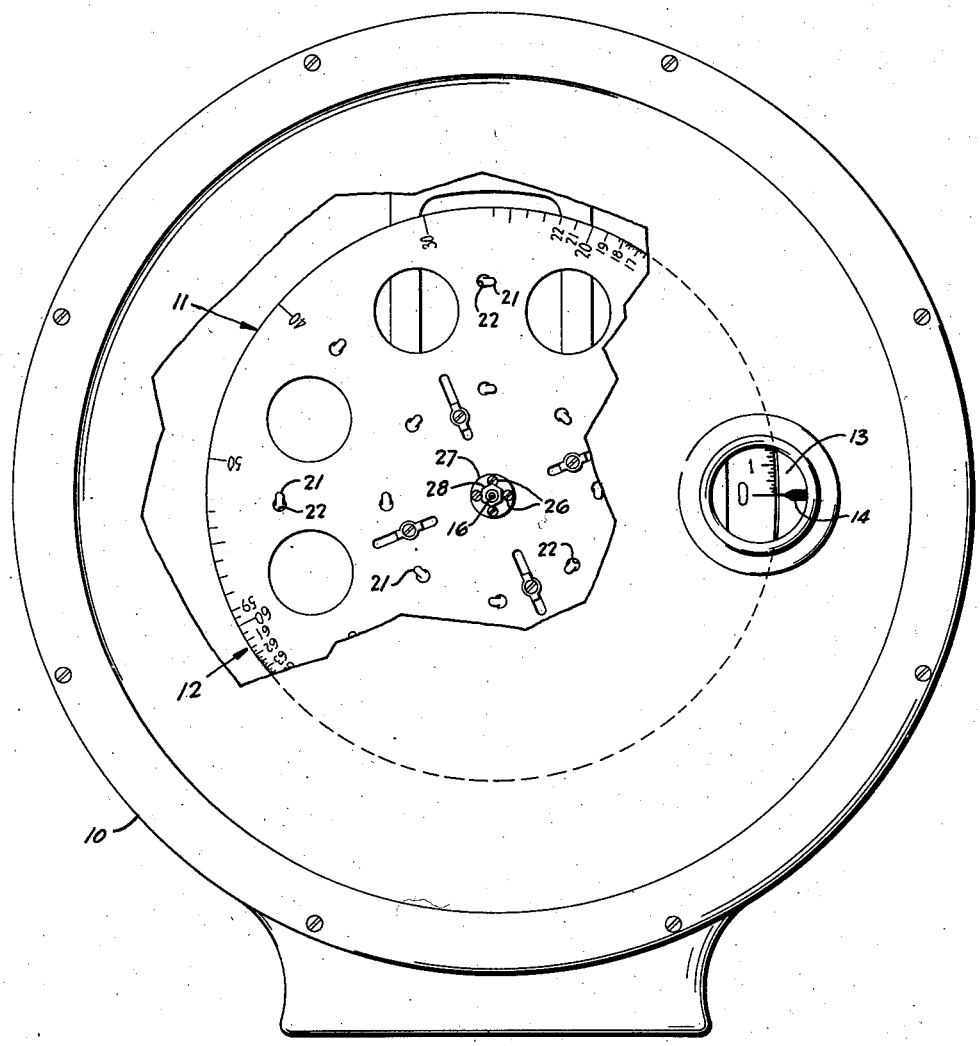
*Fig. I*
Lawrence S. Williams
INVENTOR.
BY Marshall & Marshall
ATTORNEYS July 4, 1944.   L. S. WILLIAMS   2,353,099
CHART
Filed Jan. 4, 1943   2 Sheets-Sheet 2
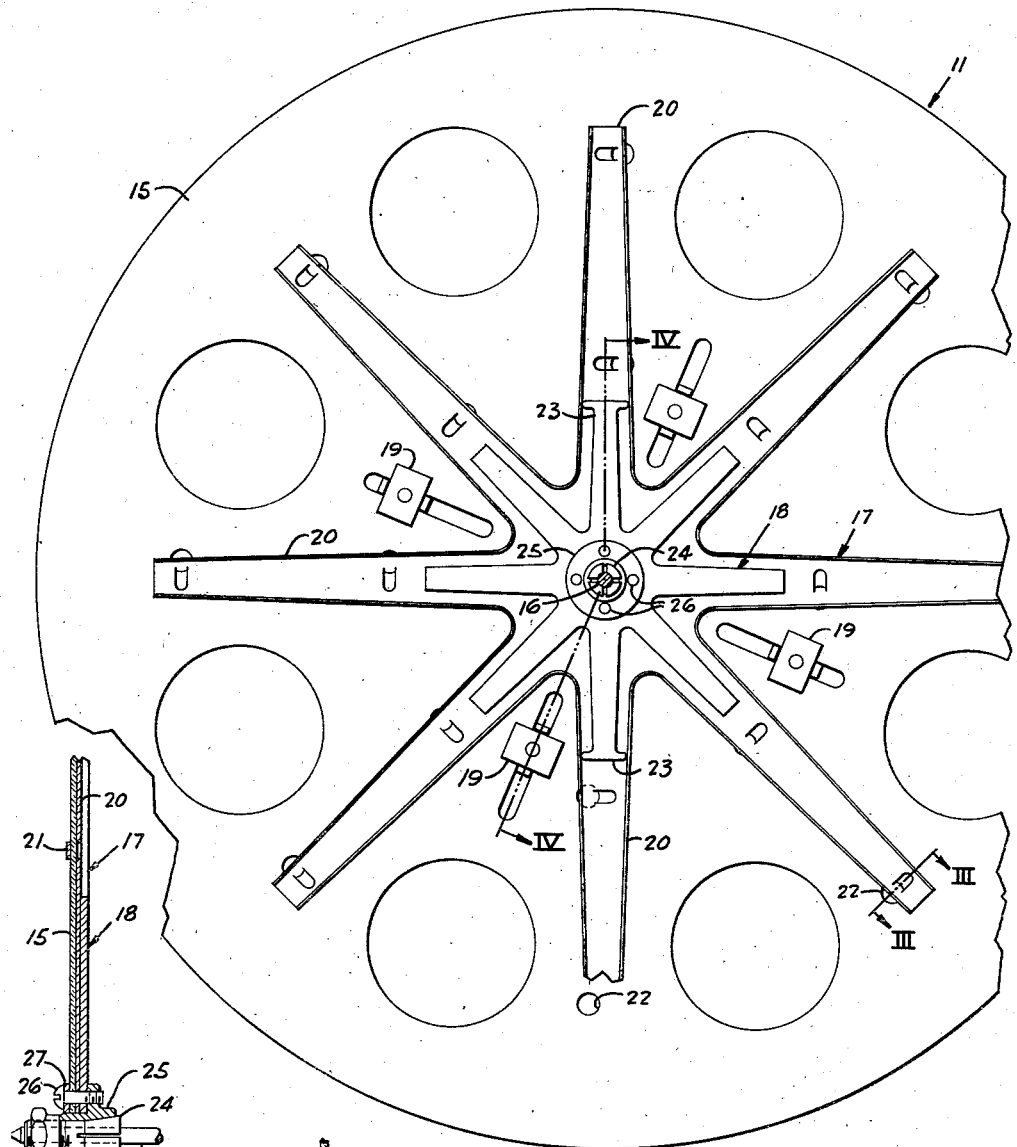
Fig. II
Fig. III
Fig. IV
Lawrence S. Williams
INVENTOR.
BY 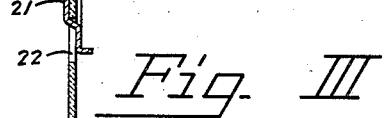
ATTORNEYS Patented July 4, 1944

2,353,099

UNITED STATES PATENT OFFICE 2,353,099

CHART

Lawrence S. Williams, Toledo, Ohio, assignor to Toledo Scale Company, Toledo, Ohio, a corporation of New Jersey Application January 4, 1943, Serial No. 471,302

5 Claims. (Cl. 116—129)

This invention relates to charts for use with sensitive highly accurate condition-responsive instruments.

In many condition-responsive instruments it is desirable that the indication of the condition under measurement be afforded by the comparison of a stationary index and a rotatable indicia bearing chart. In many such instruments, however, because of the sensitivity of the instrument and the speed in which it is operated the moment of inertia of such a chart interposes a serious element of error into the instrument readings. If the rotatable chart is of sufficient size to bear an adequate number of indicia it may be so large that its moment of inertia creates an error too large to be tolerated. On the other hand if the chart is made small enough so that its moment of inertia is extremely low it is not large enough to bear sufficient indicia adequately to indicate the values being measured.

Attempts have been made to combine these two considerata by providing so-called "spiders" which serve as frames for charts constructed of light material. These attempts have not been entirely satisfactory for two reasons: First, although spiders have been made with channel shaped arms, thus achieving rigidity of the arms themselves, no rigidity can be provided at the hub where the channels fade without making the spider of heavy material and thus defeating its purpose. Second, since the spider must be made of material relatively much heavier than the material which it supports, the co-efficients of expansion of the two materials are substantially different and this difference often cause distortion of the lighter material.

It is an object of this invention to provide a rotatable indicia bearing chart of large size but having a very low moment of inertia.

It is another object of this invention to provide a large size rotatable indicia bearing chart in which expansion and contraction are compensated for automatically.

It is a further object of this invention to provide a rotatable disk chart in which the body of the chart can be constructed of extremely light material supported by a spider which is of light weight where greatly removed from the center of rotation and of greater weight at the center of rotation only, thus materially reducing the moment of inertia of the chart.

More specific objects and advantages are apparent from the description, in which reference is had to the accompanying drawings illustrating a preferred form of chart embodying the invention.

In the drawings:

Fig. I is a view in elevation, certain parts being broken away, of the head of a condition-responsive instrument (in this case a weighing scale) employing a chart embodying the invention.

Fig. II is a view in elevation from the rear of a chart embodying the invention.

Fig. III is a sectional view on an enlarged scale taken substantially on the line III—III of Fig. II.

Fig. IV is a fragmentary sectional view on an enlarged scale taken substantially on the line IV—IV of Fig. II.

These specific drawings and the specific description that follows merely disclose and illustrate the invention and are not intended to impose limitations upon the claims.

Mounted within a chart housing 10 of a condition-responsive instrument is a disk like chart 11 which bears near its periphery a series of indicia 12. The indicia 12 are visible through a magnifying lens 13 set in the outer wall of the housing 10 and cooperate with an index 14 to indicate the values of condtions under measurement.

The chart 11 (Fig. II) comprises a disk like indicia bearing member 15 which is stamped or formed from an extremely light weight material. This member may be constructed of any one of many different materials, the only requisites being that it is light weight, substantially moisture proof and relatively rigid. For example, "Vinylite" or laminated resin impregnated paper have been found to be satisfactory.

The indicia bearing member 15 is supported on its shaft 16 by a compound spider made up of two members 17 and 18 and may carry a plurality of radially adjustable weights 19 for compensating for sine curve errors in the operation of the instrument.

The spider member 17 is shown as comprised of 8 equally spaced arms 20 each of which is channel shaped, as shown in Fig. III. The spider member 17 may be formed of thin light weight material and its arms, because of their channel shape, have great longitudinal rigidity. The indicia bearing member 15 is connected to the spider member 17 by means of a plurality of tabs 21 which are stamped from the arms 20 and extend through holes 22 punched through the member 15.

Although the arms 20 of the spider member 17 are rigid the hub section of such member because the channels fade out is flexible and therefore, the spider member 18 is constructed of relatively heavier material to prevent the hub section of the spider member 17 from warping or bending. The spider member 18 has the same number of arms as the spider member 17, each one of them lying along one of the arms 20 and being welded thereto. Two arms 23 of the spider member 18 may be provided with T shaped ends to center the two spider members.

The dial assemblage comprising the indicia bearing member and spider members 17 and 18 is secured to the shaft 16 by means of a collet 24 (Fig. IV). A hub 25 is fastened to the chart members by means of a plurality of screws 26 which extend through an annular plate 27 and the members 15, 17 and 18 into the hub 25. The hub 25 in turn is mounted on the collet 24 which is secured to the shaft 16 by means of the compression action of a nut 28 which pulls the collet into a taper in the hub 25.

As can be seen in Fig. II those portions of the chart assembly which are farthest removed from its center are light in weight and only as the hub is reached does the weight of the members increase. Therefore, since the moment of inertia is equal to the mass times the radius squared, a large chart can be constructed with a very low moment of inertia. Because the two spider members 17 and 18 cooperate, the one to support the indicia bearing member 15 and the other to strengthen the weak points of the former, a rigid structure results which is not liable to damage or distortion by inadvertent bending or contact with outside forces.

The effects of warpage on the accuracy of the chart are eliminated although the co-efficients of expansion of the spider and the indicia bearing member 15 are substantially different. This is accomplished by the fact that the spider is not firmly secured to the indicia bearing member 15 at any place but the hub and thus the difference in radial expansion of the spider member 17 and the indicia bearing member 15 does not bind either of the members. Because the expansion of the light material from which the indicia bearing member 15 is constructed is substantially uniform, such expansion, in effect, merely moves the indicia borne by the member 15 radially and thus they remain in line with the index 14 with which they cooperate.

Through the employment of the disclosed chart the indicating means of a sensitive condition-responsive instrument can have both a large size and a low moment of inertia.

The embodiment of the invention that has been disclosed may be modified to meet various requirements.

Having described my invention, I claim:

1. A condition-responsive indicating chart comprising a light weight indicia bearing member, a light weight rimless spider supporting said member and a second spider having relatively short arms for supporting the hub portion of the first spider.

2. A condition-responsive indicating chart comprising a hub, a relatively short armed spider mounted on said hub, a light weight rimless spider mounted on said hub and having relatively long arms, the arms of the first mentioned spider being relatively stiff and serving to brace the hub portion of the second mentioned spider, and a light-weight indicia bearing member secured to said hub and loosely mounted on the second mentioned spider.

3. A condition-responsive indicating chart comprising a hub, a relatively heavy short armed spider mounted on said hub, a light weight long armed rimless spider mounted on said hub, the arms of the first spider serving to brace the hub portion of the second spider, and a flat weight indicia bearing member mounted on said hub guided by the second spider and extending radially beyond the arms of the second spider.

4. A chart assembly for a condition-responsive instrument comprising a shaft, a disk-like indicia bearing member formed of light weight material, a supporting rimless spider having channel shaped arms loosely engaging said indicia bearing member, a second spider having an equal number of relatively short arms for strengthening the hub portion of the first mentioned spider and a hub for securing said indicia bearing member and both said spiders on said shaft.

5. An indicia bearing chart assemblage having a low moment of inertia and high rigidity, having a light-weight flat disk portion bearing indicia, a relatively heavy hub bracing portion, an intermediate portion for supporting said indicia bearing portion, a shaft, and a mounting member for mounting said hub portion and said assemblage on said shaft, the weight and rigidity of the assemblage portions being inversely proportional to their location, radially, from said shaft.

LAWRENCE S. WILLIAMS.